United States Patent [19]

Kawaberi et al.

[11] Patent Number: 5,051,668
[45] Date of Patent: Sep. 24, 1991

[54] SINE WAVE DEFLECTING CIRCUIT

[75] Inventors: Seiji Kawaberi; Junzo Watanabe; Hitoshi Suzuki, all of Kanagawa, Japan

[73] Assignee: Sony Corporation, Tokyo, Japan

[21] Appl. No.: 561,738

[22] Filed: Aug. 1, 1990

[30] Foreign Application Priority Data

Aug. 11, 1989 [JP] Japan .................................. 1-208537

[51] Int. Cl.$^5$ .......................... G09G 1/04; H01J 29/70
[52] U.S. Cl. ...................................... 315/408; 315/387
[58] Field of Search ................ 315/408, 371, 387, 389

[56] References Cited

U.S. PATENT DOCUMENTS 3,809,947  5/1974  Ambrico et al. .................... 315/370
4,634,940  1/1987  Groeneweg et al. ................ 315/408

Primary Examiner—Gregory C. Issing
Attorney, Agent, or Firm—Lewis H. Eslinger

[57] ABSTRACT

A sine wave deflecting circuit has a simplified configuration capable of ensuring an efficient and stable operation with a function of facilitating external synchronization. The deflecting circuit comprises a resonant circuit comprising a deflecting coil and a resonant capacitor, and a circuit for detecting a signal waveform of the resonant circuit and driving the resonant circuit in accordance with the detection signal, wherein the deflecting coil is driven with sine waves generated by self-oscillation. A deflection interruption time is set during the driving action, and the sine-wave driving frequency is controlled by controlling the length of such interruption time.

4 Claims, 3 Drawing Sheets

FIG. 3A POINT Ⓐ 
FIG. 3B POINT Ⓑ 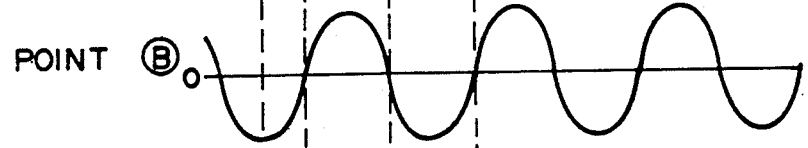
FIG. 3C POINT Ⓒ 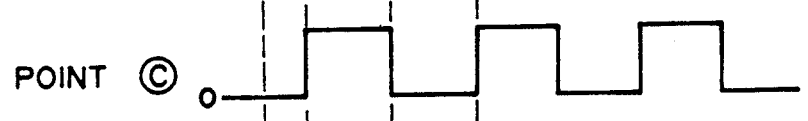
FIG. 3D POINT Ⓓ 
FIG. 3E POINT Ⓔ 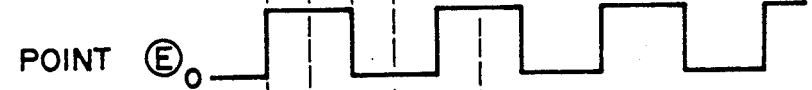
FIG. 3F Dy CURRENT 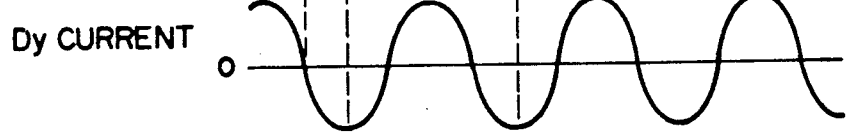

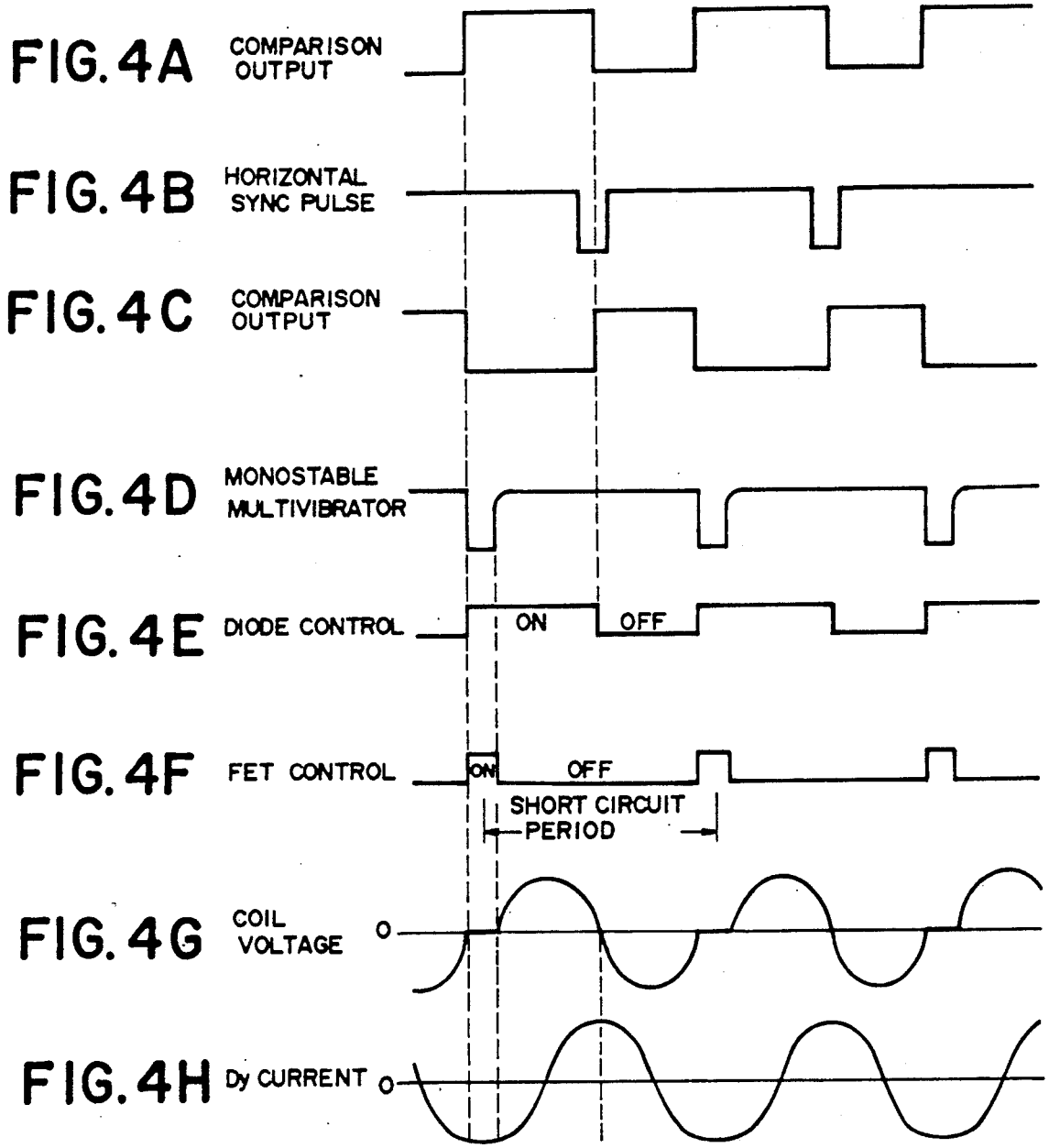

5,051,668

SINE WAVE DEFLECTING CIRCUIT

BACKGROUND OF THE INVENTION

1. Field of the Invention

The present invention relates to a sine wave deflecting circuit for use in a cathode-ray tube of a television receiver.

2. Description of the Prior Art

It is known that, in a cathode-ray tube of a television receiver for example, sine wave deflection is performed in place of customary sawtooth wave deflection, as disclosed in, e.g., U.S. Pat. No. 4,672,449.

According to such sine wave deflection, there can be attained the following advantages.

(1) Any sharp variation of a deflection current can be suppressed due to the nonexistence of a retrace interval, so that a high-frequency disturbing component is decreased to consequently reduce a burden on a deflecting yoke.

(2) Since none of high voltage pulses is generated, a burden on the device is diminished.

(3) The deflection current frequency may be half a scanning frequency. Meanwhile, if the same current frequency is employed, a double scanning frequency can be obtained.

In the conventional sine wave deflecting circuit known heretofore, as described in the above U.S. Patent also, the means employed for generating a deflection current is based on the technique of first generating a sine wave signal of a low level and then amplifying the same. This technique, however, is disadvantageous in view of an extremely great power consumption.

There may be contrived a separately excited deflecting circuit where a resonant circuit is formed inclusive of a deflecting coil to keep oscillation while being driven by an energy supplied from an external oscillator. In such arrangement, however, a phase shift is prone to occur between the energy supply and the resonance to eventually bring about an extremely great possibility of causing operational instability.

Furthermore, in the case of using a resonant circuit, there arises another problem that exact external synchronization is not attainable with facility.

OBJECTS AND SUMMARY OF THE INVENTION

The present invention has been accomplished in view of the problems mentioned. And its object is to provide an improved sine wave deflecting circuit which is simple in configuration and is capable of ensuring an efficient and stable operation with an advantageous function of facilitating external synchronization.

In the present invention, a resonance circuit including a deflecting coil is driven with sine waves generated by self-oscillation, and a deflection interruption time is set during such driving action to thereby perform a stable sine wave deflecting operation with high efficiency. And furthermore the driving frequency control can also be executed as required.

According to one aspect of the present invention, there is provided a sine wave deflecting circuit which comprises a resonant circuit consisting of a deflecting coil and a resonant capacitor, and a circuit for detecting a signal waveform of the resonant circuit and driving the resonant circuit in accordance with the detection signal, wherein the deflecting coil is driven with sine waves generated by self-oscillation. In the above arrangement, the feature of the present invention resides in the provision of a means for setting a deflection interruption time during the sine-wave driving action, and the driving frequency is controlled by controlling the length of such interruption time.

The above and other objects and features of the present invention will be apparent in detail from the following description which will be given with reference to the illustrative accompanying drawings.

BRIEF DESCRIPTION OF THE DRAWINGS

FIGS. 3A-F and 4A-H are waveform charts of signals for explaining the operation in the circuit of FIG. 1.

DESCRIPTION OF THE PREFERRED EMBODIMENT

Figure 1:
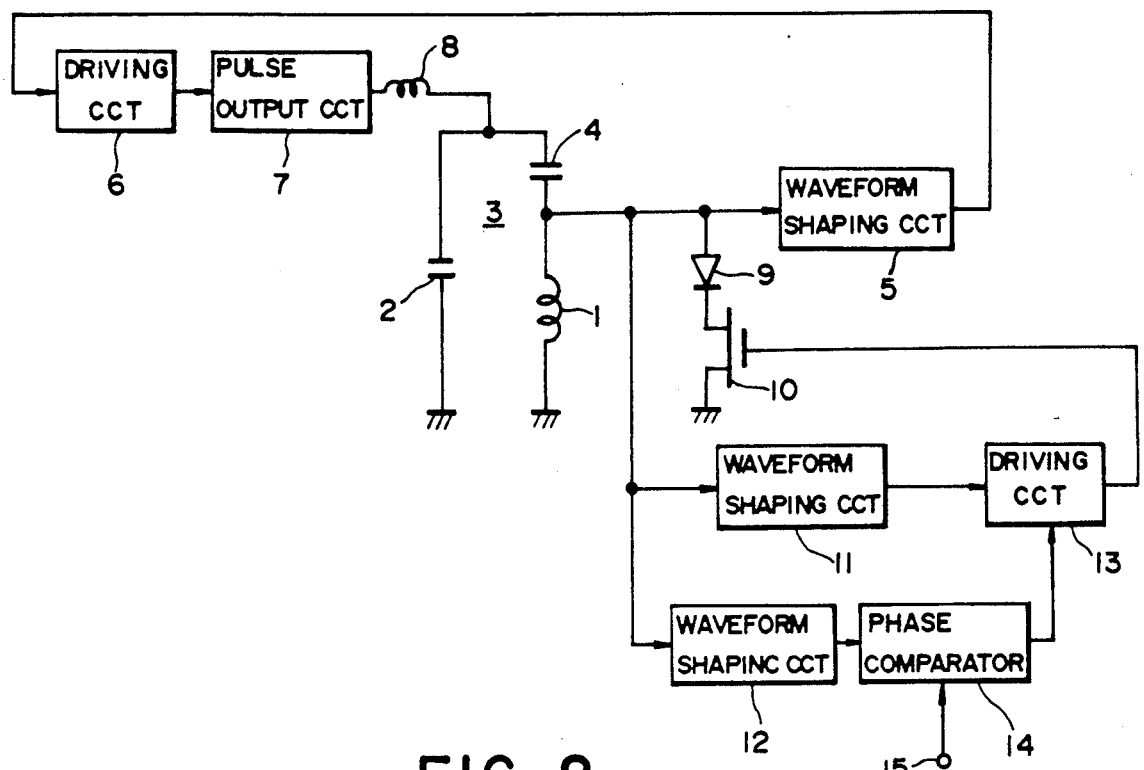
FIG. 1 is a block diagram of an exemplary embodiment of the sine wave deflecting circuit according to the present invention.

FIG. 1 is a block diagram of the sine wave deflecting circuit of the present invention, wherein reference numeral 1 denotes a coil constituting a deflecting yoke. This coil 1 and a capacitor 2 are connected in parallel with each other to form a resonant circuit 3. Denoted by 4 is a DC blocking capacitor connected in series with the coil 1.

One end of the resonant circuit 3 is grounded. A voltage obtained across the coil 1 is supplied to a waveform shaping circuit 5, whose output signal is then supplied via a driving circuit 6 to a pulse output circuit 7. And the pulse output from the circuit 7 is supplied via a coil 8 to the other end of the resonant circuit 3.

In this arrangement, energy is supplied from the pulse output circuit 7 via the coil 8 to the resonator consisting of coils 1, 8 and capacitors 2, 4, whereby the voltage across the coil 1 is shaped into a desired waveform and then is fed back to the driving circuit 6 to perform self-oscillation.

In addition, a parallel circuit of a diode 9 and a field effect transistor (FET) 10 is connected in parallel with the coil 1. The voltage across the coil 1 is supplied to waveform shaping circuits 11, 12. The output signal of the circuit 11 is supplied to a driving circuit 13, while the output signal of the circuit 12 is fed to a phase comparator 14 so as to be phase-compared with a horizontal synchronizing pulse obtained from a terminal 15, and the resultant comparison output is supplied to the driving circuit 13. Then the output signal of the circuit 13 is supplied to a gate of the FET 10.

Due to the above circuit configuration, the FET 10 is switched on at an instant the voltage across the coil 1 is reduced to zero, and the on-state of the FET 10 is maintained during a period corresponding to the phase difference between such instant and the horizontal synchronizing pulse, so that the sine-wave driving action is interrupted during such period.

Figure 2:
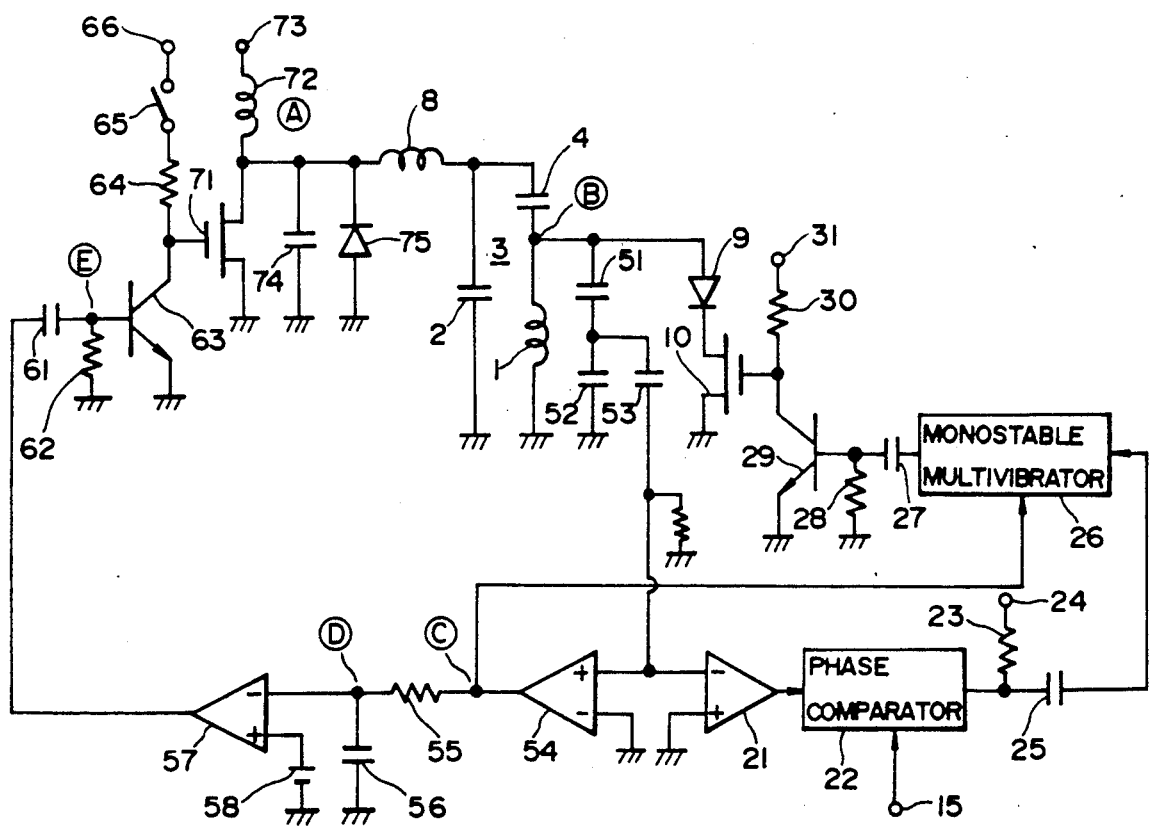
FIG. 2 is a circuit diagram of the embodiment shown in FIG. 1.

FIG. 2 is an exemplary connection diagram of the sine wave deflecting circuit. In this diagram, the voltage across the coil 1 is supplied to a voltage divider composed of capacitors 51, 52, and the voltage output therefrom is supplied via a capacitor 53 to a non-inverting input terminal of a comparator 54 so as to be compared with a ground potential supplied to an inverting input terminal thereof. The output of the comparator 54 is supplied to an integrator composed of a resistor 55 and a capacitor 56, whose integrated output is then supplied to an inverting output terminal of a comparator 57 so as to be compared with a potential supplied from a voltage source 58 to a non-inverting input terminal thereof.

The output of the comparator 57 is grounded via a series circuit of a capacitor 61 and a resistor 62, while a signal at the junction of the capacitor 61 and the resistor 62 is supplied to the base of a transistor 63. The emitter of this transistor 63 is grounded, and its collector is connected to a power terminal 66 via a series circuit of a resistor 64 and a switch 65.

Thereafter a signal obtained from the collector of the transistor 63 is supplied to the gate of an FET 71. The source of the FET 71 is grounded, while its drain is connected via a coil 72 to a power terminal 73, and further the drain is grounded via a parallel circuit of a capacitor 74 and a diode 75. And a signal obtained at the drain of the FET 71 is supplied to a coil 8.

The signal from the capacitor 53 is supplied to the inverting input terminal of a comparator 21 and is thereby compared with the ground potential supplied to its non-inverting input terminal. The comparison output thus obtained is then supplied to a phase comparator 22 and is thereby compared with the horizontal synchronizing pulse fed from the terminal 15. A bias voltage from a power terminal 24 is supplied via a resistor 23 to the output terminal of the phase comparator 22, and simultaneously the comparison output therefrom is supplied via a capacitor 25 to a control terminal of a monostable multivibrator 26. Meanwhile the output from the comparator 54 is supplied to a trigger terminal of the multivibrator 26. The output signal of the multivibrator 26 is grounded via a series circuit of a capacitor 27 and a resistor 28, and a signal obtained at the junction of the capacitor 27 and the resistor 28 is supplied to the base of a transistor 29. The emitter of the transistor 29 is grounded, while its collector is connected via a resistor 30 to a power terminal 31. And a signal obtained from the collector of the transistor 29 is supplied to the gate of the FET 10.

Accordingly, when the switch 65 is first turned on in the circuit configuration mentioned above, the FET 71 is switched on to lower the potential at its drain (point (A)), whereby the potential at one end (point (B)) of the deflecting coil 1 is also lowered. As a result, the potential at the non-inverting input terminal of the comparator 54 is rendered negative, and the potential at the output terminal (point (C)) of the comparator 54 is lowered. The change in the output potential of the comparator 54 is integrated (point (D)), and when the integrated potential has further been lowered beyond the potential obtained from the voltage source 58, the potential at the base (point (E)) of the transistor 63 is raised to switch off the FET 71.

The required energy is supplied to the resonator in response to a pulse generated upon switching-off of the FET 71, so that resonance is started. And when the potential at point (B) is turned to be positive, the output potential of the comparator 57 is lowered to switch off the FET 71. Such operation is repeated to continue the oscillation.

FIGS. 3A through 3F show the waveforms of signals produced in the principal circuit portions in a fundamental state of oscillation, in which FIG. 3F represents the waveform of a current flowing in the deflecting coil 1.

Therefore, in the circuit configuration mentioned above, a sine-wave deflection current can be caused to flow in the deflecting coil 1 by self-oscillation.

In contrast therewith, the output of the comparator 21 has such waveform as shown in FIG. 4A. Meanwhile the terminal 15 is fed with a horizontal synchronizing pulse of a waveform shown in FIG. 4B. This example represents a case of performing double-speed horizontal deflection with sine waves. The phase difference between the horizontal synchronizing pulse and the sine-wave deflection current is detected, and the resultant comparison output is then supplied to the multivibrator 26.

The output of the comparator 54 has such waveform as shown in FIG. 4G. And when this comparison output is supplied to the multivibrator 26, it produces an output signal of FIG. 4D. The trailing-edge start point of this output signal is determined by the output of the comparator 54, and the length of the trailing-edge duration thereof is proportional to the comparison output of the phase difference obtained from the comparator 22. This signal is supplied via the transistor 29 to the gate of the FET 10.

In this stage, the diode 9 is switched on and off as shown in FIG. 4E. Meanwhile the FET 10 is so controlled as to be switched on and off as shown in FIG. 4F, whereby the two ends of the coil 1 are short-circuited during the on-time thereof. Consequently, the voltage across the coil 1 becomes such as shown in FIG. 4G. FIG. 4H represents the waveform of the current flowing in the coil 1.

According to the above circuit configuration, the diode 9 and the FET 10 are switched on at one zero-crossing point of the voltage across the coil 1, thereby interrupting the driving action. And the length of such interruption time is controlled in conformity with the phase difference between the horizontal synchronizing pulse and the other zero-crossing point of the voltage across the coil 1. Therefore, if a control is so executed that a desired interruption is continuously retained by setting the resonance frequency of the resonant circuit 3 to be slightly higher than a desired frequency, the oscillation signal can be synchronized with an external horizontal synchronizing pulse, whereby automatic frequency control (AFC) can be performed.

Thus, according to the constitution mentioned, it becomes possible to achieve a remarkable reduction of the power consumption by forming a resonant circuit including a deflecting coil, and due to employment of a self-oscillation type, the phase relationship between the energy supply and the resonance is kept constant to consequently attain a stable operation. Furthermore, an interruption time is set during the driving action and is controlled with respect to its length to facilitate external synchronization, hence realizing satisfactory sine wave deflection in a simplified arrangement.

In an exemplary case of applying the present invention of the above circuit configuration to a 34-inch color cathode-ray tube, it is possible to reduce the horizontal pulse voltage, the current and the power consumption of the horizontal deflecting circuit in comparison with a conventional television receiver of the same size and a 29-inch double speed receiver, as listed in a table shown below.

TABLE

|  | This invention (34") | Prior Art (34") | Double Speed (29") |
|---|---|---|---|
| Horizontal pulse voltage (V) | 250 | 1200 | 1200 |
| Deflection current (p—p value) (V) | 1 | 4.5 | 8 |
| Supply voltage (V) | 65 | 135 | 135 |
| Power consumption in horizontal deflection (W) | 22 | 30 | 50 |

The deflection in the present invention is performed in a double speed mode.

Relative to the apparatus described in the above cited references, the nominal ratins include a deflection frequency of 62 kHz, a buffer amplifier output of 14 Vp-p, and power consumption of 8 W in the deflecting yoke. However, since the output current of the buffer amplifier is equivalent to the yoke current, the power consumption in the buffer amplifier is considered to be extremely great.

Further in the above apparatus, the output phase of the comparator 57 can be controlled by adjusting the voltage of the voltage source 58, whereby the phase relationship in the oscillation is optimized.

The current in each of the coils 1 and 8 is dominated by the turn ratio thereof. Therefore, if the turn ratio of the coil 8 is increased to a multiple n, the current supplied thereto can be reduced to 1/n. And remarkably satisfactory driving action can be achieved by selectively adjusting the 1/n current in conformity with the circuit loss.

According to the present invention, as described hereinabove, the power consumption is greatly reducible by forming a resonant circuit including a deflecting coil, and the phase relationship between the energy supply and the resonance can be maintained constant due to employment of a self-oscillation type to consequently ensure a stable operation. Furthermore, the length of an interruption time set during the driving action is controlled to facilitate external synchronization, hence attaining satisfactory sine wave deflection in a simplified arrangement.

What is claimed is:

1. A sine wave deflecting circuit comprising: a resonant circuit comprising a deflecting coil and a resonant capacitor and producing a signal waveform; and a circuit for detecting said signal waveform of said resonant circuit to produce a detection signal and for driving said resonant circuit in accordance with the detection signal; wherein said deflecting coil is driven with sine waves generated by self oscillation;

said deflecting circuit further comprising means for setting a deflection interruption time during a time when said deflecting coil is being driven with said sine waves, wherein said sine waves have a driving frequency that is controlled by controlling the length of said interruption time.

2. A sine wave deflecting circuit according to claim 1 wherein a range of voltage values including zero is obtained across said deflecting coil and said interruption time is started when the voltage obtained across said deflecting coil has become zero.

3. A sine wave deflecting circuit according to claim 1 wherein the deflecting circuit is used with a video signal having a horizontal period and a reciprocating scanning interval is set in accordance with the horizontal period by giving the sine waves substantially the same period as the horizontal period of the video signal.

4. A sine wave deflecting circuit according to claim 1 wherein said interruption time setting means comprises a unidirectional switching circuit connected in parallel with said deflecting circuit.

* * * * *